United States Patent [19]

ter Jung et al.

[11] 4,401,790
[45] Aug. 30, 1983

[54] PROCESS FOR THE MANUFACTURE OF POLYVINYL ALCOHOL BY ALCOHOLYSIS OF A POLYVINYL ESTER

[75] Inventors: Hermann ter Jung, Kelkheim; Leonhard Reihs, Schwalbach; Gerhard Roh, Hofheim am Taunus, all of Fed. Rep. of Germany

[73] Assignee: Hoechst Aktiengesellschaft, Frankfurt am Main, Fed. Rep. of Germany

[21] Appl. No.: 281,349

[22] Filed: Jul. 8, 1981

[30] Foreign Application Priority Data

Jul. 10, 1980 [DE] Fed. Rep. of Germany ....... 3026144

[51] Int. Cl.$^3$ .............................................. C08F 8/12
[52] U.S. Cl. .................................. 525/62; 525/56; 528/486
[58] Field of Search ................................... 525/56, 62

[56] References Cited

U.S. PATENT DOCUMENTS

| | | | |
|---|---|---|---|
| 2,227,997 | 1/1941 | Berg | 525/62 |
| 2,502,715 | 4/1950 | Germain | 525/62 |
| 2,779,752 | 1/1957 | Vining | 525/62 |
| 2,950,271 | 8/1960 | Snyder | 525/62 |
| 3,278,505 | 10/1966 | Kominami | 525/62 |
| 3,487,060 | 12/1969 | Bristol | 525/62 |
| 3,541,069 | 11/1970 | Bristol et al. | 525/62 |
| 3,697,495 | 10/1972 | Bristol | 525/62 |

Primary Examiner—Stanford M. Levin
Attorney, Agent, or Firm—Curtis, Morris & Safford

[57] ABSTRACT

Polyvinyl alcohol is manufactured by the alcoholysis of polyvinyl esters, in particular polyvinyl acetate, in the presence of a basic catalyst and in the presence of an alkanol as the solvent. The degree of polymerization of the polyvinyl ester used as the starting material is normally within the range from 400 to 10,000. The catalyst used is preferably an alkali metal hydroxide or an alkali metal alcoholate. The alcoholysis is effected by first preparing a solution of the polyvinyl ester, which is then trans-esterified at an elevated temperature. The resulting polyvinyl alcohol exhibits a high degree of purity. It is suitable for use as a base material for the production, by thermoplastic methods, of shaped articles, chiefly by compression molding, injection molding and extrusion.

2 Claims, No Drawings

PROCESS FOR THE MANUFACTURE OF POLYVINYL ALCOHOL BY ALCOHOLYSIS OF A POLYVINYL ESTER

The invention relates to a process for the manufacture of polyvinyl alcohol and to the polyvinyl alcohol obtained by this process.

As is known, polyvinyl alcohol is formed by the solvolysis (trans-esterification) of polyvinyl esters, in particular polyvinyl acetate. Thus, it has been known for a long time that polyvinyl alcohol is obtained from polyvinyl esters by reacting the latter with an absolute alcohol, for example, methanol, in the presence of an acid or alkaline catalyst (compare German Patent Specification No. 763,840). A suitable catalyst for this process is, in particular, an alkali metal alcoholate. The reaction is carried out in devices which permit the intimate mixing of viscous compositions, for example in a kneader. It is advantageous to use low temperatures, for example 20° to 25° C. The polyvinyl alcohol is produced in the form of a white product having a degree of purity of about 99%.

It is also known that the alcoholysis of polyvinyl acetate by means of methanol in the presence of an alkaline catalyst, preferably sodium hydroxide, effects a virtually complete saponification and produces a polyvinyl alcohol which is essentially free from acetate groups (compare U.S. Pat. No. 3,278,505). The catalyst is employed in this process in an amount of 0.006 to 0.15 mole per mole of polyvinyl acetate, specifically in an aqueous or methanolic solution. The polyvinyl acetate, which is employed as the starting material in the form of a paste, is first diluted with methanol so as to give a solution having a concentration of 10 to 70 percent by weight, and this polyvinyl acetate solution is then mixed with the catalyst solution at a temperature of 25° to 60° C. It is preferable to use polyvinyl acetate solutions of low concentration, containing about 15 to 30 percent by weight.

The object of the invention is the preparation of polyvinyl alcohol by the catalytic alcoholysis of a polyvinyl ester in the presence of as small a quantity of solvent as possible.

The invention relates to a process for the manufacture of polyvinyl alcohol by the alcoholysis of a polyvinyl ester in the presence of a basic catalyst and in the presence of an alkanol as solvent, and comprises first dissolving, in a reactor equipped with means for heating and cooling, a polyvinyl ester having a degree of polymerization of 400 to 10,000 (determined from the weight average of the molecular weight) in a lower alkanol, the alkanol being employed in an amount of 10 to 50 percent by weight (relative to the polyvinyl ester), then mixing the resulting solution at a temperature of 30° to 60° C. with a solution of the catalyst in a lower alkanol, so as to form a homogeneous mixture, then warming the mixture to a temperature of 70° to 150° C. and, finally, cooling the resulting polyvinyl alcohol to a temperature of 20° to 40° C. and neutralizing, washing and drying it in a customary manner.

The starting material used for the process according to the invention is a polyvinyl ester which has been prepared in a customary manner by polymerizing a vinyl ester of a lower aliphatic carboxylic acid, such as acetic acid, propionic acid or butyric acid. Polyvinyl acetate is particularly suitable. The degree of polymerization of the polyvinyl ester (determined from the weight average of the molecular weight) is in the range from 400 to 10,000, preferably 500 to 6,000.

The alcoholysis of the polyvinyl ester is carried out in the presence of a lower alkanol, preferably an alkanol having 1, 2 or 3 carbon atoms, such as methanol, ethanol, propanol and isopropanol; methanol is particularly suitable in this context. The alkanol is used in an amount of 10 to 50 percent by weight, preferably 20 to 40 percent by weight (relative to the polyvinyl ester).

The alcoholysis process according to the invention is carried out in the presence of a basic catalyst. It is preferable to use an alkali metal hydroxide or alkali metal alcoholate as the catalyst. Examples of suitable catalysts are sodium hydroxide, potassium hydroxide, sodium methylate, ethylate and propylate as well as potassium methylate, ethylate and propylate. The catalyst is used in the form of a solution, an alkanol of the type mentioned above being used as the solvent. The amount of the catalyst is usually 1 to 10 percent by weight, preferably 6 to 9 percent by weight (relative to the polyvinyl ester). The concentration of the catalyst solution is appropriately within the range from 10 to 25 percent by weight, preferably 12 to 20 percent by weight.

The polyvinyl ester is first dissolved in the lower alkanol and is then mixed with the catalyst solution at a temperature of 30° to 60° C., preferably 35° to 50° C., so as to form a homogeneous mixture. The mixture thus obtained is then warmed to a temperature of 70° to 150° C., preferably 75° to 100° C., as a result of which the trans-esterification is started. Depending on the type and quantity of the polyvinyl ester, a period of 1 to 5 minutes is required for the trans-esterification reaction.

Finally, the polyvinyl alcohol obtained after the trans-esterification reaction is cooled to a temperature of 20° to 40° C., preferably 25° to 35° C., and is neutralized, washed and dried in the customary manner. The neutralization is effected by means of a weak inorganic, or preferably organic, acid, for example phosphoric acid or acetic acid.

After being neutralized, the polyvinyl alcohol is washed with a lower alkanol of the type mentioned above. The final drying is carried out at a temperature of 70° to 175° C., preferably 90° to 140° C. It is advantageous to carry out the drying under an inert gas, for example nitrogen.

The trans-esterification process of the invention is carried out in a reactor equipped with apparatus for heating and cooling. This makes it possible to set up heating and cooling zones in the reactor, as required. It is preferable to use a reactor which enables the process to be carried out continuously and which is equipped with means for continuously mixing and conveying the reaction material. An extruder having one screw, or even two screws, is particularly suitable.

The polyvinyl alcohol manufactured in accordance with the invention is in the form of a white, granular product which is distinguished by good flow properties. The average particle diameter of the polyvinyl alcohol is within the range from 0.1 to 1.5 mm, preferably 0.3 to 0.8 mm. Its ester number is generally 1 to 300 mg of KOH/g, preferably 10 to 150 mg of KOH/g. The degree of purity of the polyvinyl alcohol is at least 95%, preferably >98%. The polyvinyl alcohol is suitable for use as a base material for the production, by thermoplastic methods, of shaped articles of all kinds, for example sheets, tubes, profiles, fibers and films. It is processed by thermoplastic methods mainly by compression molding, injection molding and extrusion.

The following examples serve to illustrate the invention in greater detail.

EXAMPLE 1

15 kg of polyvinyl acetate having a degree of polymerization of 3,900 are dissolved in 5 kg of methanol in an extrusion reactor (a single-screw extruder) and are mixed with a solution of 0.9 kg of sodium ethylate in 5 kg of methanol, the quantities being referred to periods of one hour, at a temperature of 40° C. to form a homogeneous mixture, the mixture is warmed to 80° C. and the product is discharged after an average residence time of 3 minutes. The resulting polyvinyl alcohol is cooled to room temperature, neutralized with acetic acid, washed with methanol and, finally, dried at a temperature of 110° C. The polyvinyl alcohol is a white, granular product having an average particle diameter of 0.6 mm and an ester number of 18.1 mg of KOH/g.

EXAMPLE 2

Example 1 is repeated using 0.6 kg of sodium methylate under otherwise identical conditions. The resulting polyvinyl alcohol is a white, granular product having an average particle diameter of 0.7 mm and an ester number of 24.6 mg of KOH/g.

EXAMPLE 3

30 kg of polyvinyl acetate having a degree of polymerization of 1,200 are dissolved in 10 kg of methanol in the reactor used in Example 1 and are mixed with a solution of 1.2 kg of sodium methylate in 10 kg of methanol, the quantities being referred to periods of one hour, at a temperature of 45° C. to form a homogeneous mixture, the mixture is warmed to 85° C. and the product is discharged after an average residence time of 90 seconds. The resulting polyvinyl alcohol is cooled to 25° C., neutralized with acetic acid, washed with methanol and dried at a temperature of 110° C. The polyvinyl alcohol is a white, granular product having an average particle diameter of 0.5 mm and an ester number of 53.2 mg of KOH/g.

EXAMPLE 4

Example 1 is repeated using 0.3 kg of sodium methylate under otherwise identical conditions. The resulting polyvinyl alcohol is a white, granular product having an average particle diameter of 0.4 mm and an ester number of 105.0 mg of KOH/g.

EXAMPLE 5

Example 3 is repeated using 0.6 kg of sodium methylate under otherwise identical conditions. The resulting polyvinyl alcohol is a white, granular product having an average particle diameter of 0.4 mm and an ester number of 148.7 mg of KOH/g.

We claim:

1. A process for the manufacture of polyvinyl alcohol by the alcoholysis of polyvinyl acetate in the presence of a basic catalyst and in the presence of an alkanol as solvent, which comprises first dissolving, in a reactor wherein the reactor used is a continuously working screw extruder, and further equipped with means for heating and cooling, a polyvinyl ester having a degree of polymerization of 400 to 10,000 (determined from the weight average of the molecular weight) in a lower alkanol, wherein the lower alkanol is an alkanol having 1 to 3 carbon atoms, the alkanol being employed in an amount of 20 to 40 percent by weight, relative to the polyvinyl ester, then mixing the resulting solution at a temperature of 30° to 60° C. with a solution of the catalyst wherein the catalyst is an alkali metal hydroxide or an alkali metal alcoholate in a lower alkanol, so as to form a homogeneous mixture, then warming the mixture to a temperature of 70° to 150° C. and, finally, cooling the resulting polyvinyl alcohol to a temperature of 20° to 40° C. and recovering the polyvinyl alcohol.

2. A process as claimed in claim 1, wherein in the recovery of the polyvinyl alcohol, the same is neutralized and neutralization is effected with acetic acid.

* * * * *